Figures 1, 2:
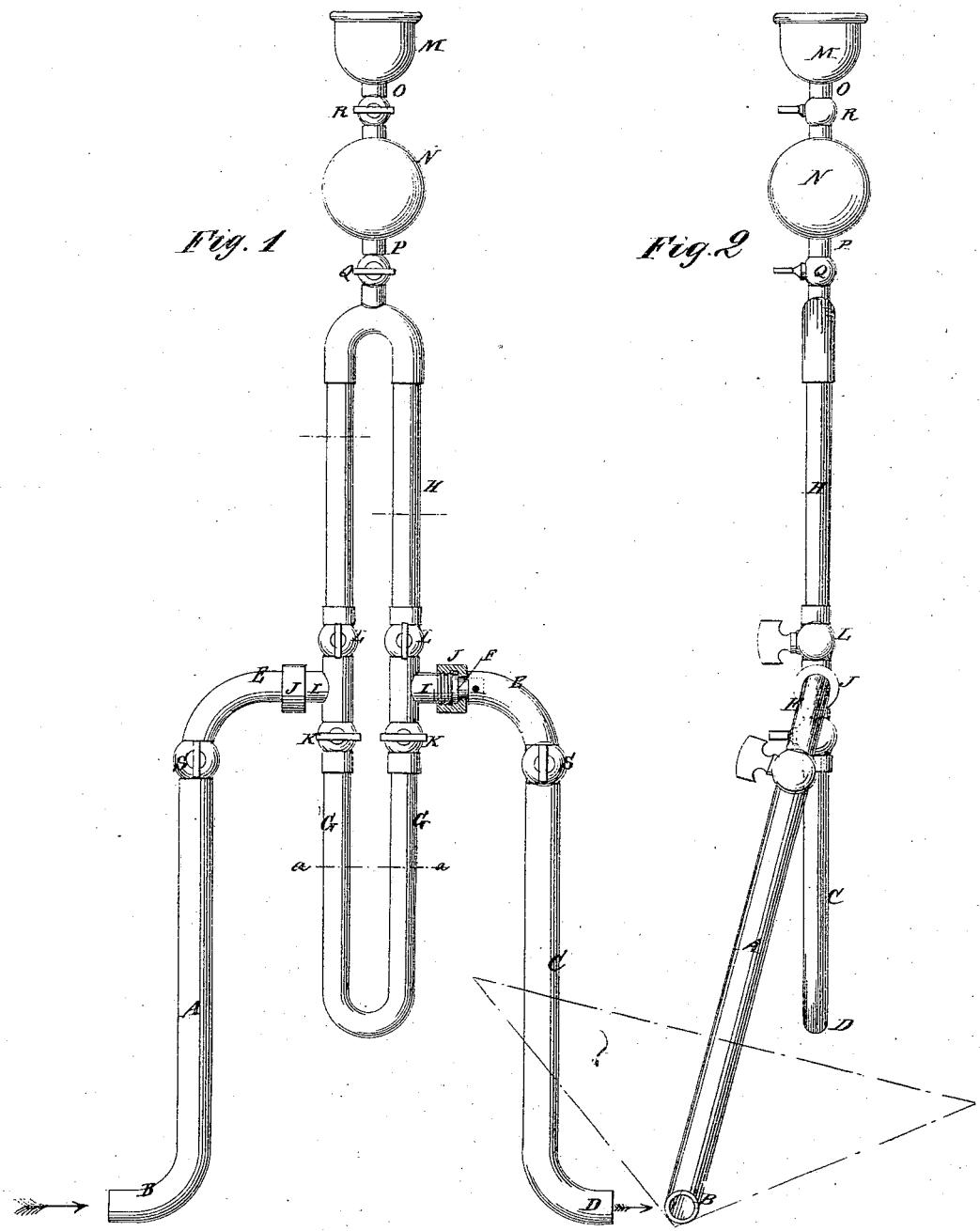

R. H. ELLIOTT.
Tachometers.

No. 153,550.  Patented July 28, 1874.

WITNESSES:

INVENTOR:
R. H. Elliott
BY
ATTORNEYS.

UNITED STATES PATENT OFFICE.

ROBERT H. ELLIOTT, OF ATLANTA, GEORGIA.

IMPROVEMENT IN TACHOMETERS.

Specification forming part of Letters Patent No. 153,550, dated July 28, 1874; application filed March 28, 1874.

*To all whom it may concern:*

Be it known that I, ROBERT H. ELLIOTT, of Atlanta, in the county of Fulton and State of Georgia, have invented a new and Improved Tachometer, of which the following is a specification:

My invention consists of a water-gage and a mercury-gage combined with a pipe extending through the hull of the vessel to receive the impulse of the water, and another to be acted on by the suction, and suitable cocks, so contrived that either gage can be put in connection with the water-pipes for using water or mercury for indicating the ship's speed—an arrangement which adapts the instrument for very low speeds, which will not effect much change in the mercury, and very high speeds, which will effect too much change for a water-gage of practicable length. The invention also consists of a filling attachment to the gage-tubes for supplying water or mercury, and allowing air to escape, as a convenient means of rearranging and regulating the gage from time to time, as may be required.

Figure 1 is a side elevation of my improved tachometer, and Fig. 2 is also a side elevation, but taken in a plane at right angles to that of Fig. 1.

Similar letters of reference indicate corresponding parts.

A represents the pipe extending through the hull into the water to receive the impulse of the water in its lower end, B, which is turned in the direction in which the vessel moves. C is the other water-pipe, also extending through the hull, but turning in the opposite direction at D, to be exposed to the suction of the water. These pipes are arranged fore and aft of each other in the ship, and bend toward each other at the top E, terminating in pivots F, on which the mercury and water gages G and H are jointed by trunnions I and screw-caps J, so that, as the water-pipes A and C roll with the vessel, the gages may be kept in a true vertical line to prevent the variations and unsteady action due to the swinging of the gages with the vessel. K represents cocks in the mercury-gage pipes below the pivots to shut off the communication with them when the water-gage is used; L, cocks to shut off communication with the water-gage when the mercury-gage is used. M is a cup, and N a hollow globe connected by pipe O, and connected to the top of the water-gage by pipe P, and provided with cocks Q and R for introducing water without admitting air in case it may be wanted to do so to make up any loss that may occur from leakage or other causes, for air so admitted would allow the water to escape from one side through the suction-pipe.

The mercury-gage being filled to the line $a$, the water forced up through tube A upon it in one side of the gage, and the vacuum formed over it in the other side by the suction at D, will cause the mercury to sink in one side and rise in the other side, so as to show by the scale marked on the gage-tubes the speed of the vessel. In this case the cocks K will be opened and cocks L closed. The operation will be the same when the water-gage is used, the cocks L being then opened and K closed.

The water-gage may be used altogether in vessels in which the necessary height will not be objectionable; but in lower vessels making quick speed the mercury-gage will be mainly used for fast speed; but the water-gage may also be employed for use when the speed is slow, being preferable on account of the greater range of movement, and consequently the greater accuracy of register on the scale. The cocks S are used to shut off the water when the instrument is not used; also for filling it.

Having thus described my invention, I claim as new and desire to secure by Letters Patent—

1. The combination of the mercury-gage G, a water-gage, H, and cocks K L with the water-pipes A C of a tachometer, substantially as specified.

2. The combination of the filler M N P R with the speed-indicative device, as shown and described, for the purpose specified.

ROBERT HABERSHAM ELLIOTT.

Witnesses:
F. A. SHOAP,
JNO. B. ELLIOTT.